April 3, 1962 A. B. GRÖNBERG 3,027,925
ROTARY CUTTER HAVING A VERTICALLY UPWARD INTAKE
Filed Nov. 21, 1958 3 Sheets-Sheet 2

INVENTOR
ANTON BERTIL GRÖNBERG
BY
Cushman, Derby & Cushman
ATTORNEYS

United States Patent Office 3,027,925
Patented Apr. 3, 1962

3,027,925
ROTARY CUTTER HAVING A VERTICALLY UPWARD INTAKE
Anton Bertil Grönberg, Villa Karlsborg, Ottum, Sweden
Filed Nov. 21, 1958, Ser. No. 775,445
Claims priority, application Sweden Nov. 22, 1957
8 Claims. (Cl. 146—107)

The present invention relates to a device for cutting straw, green fodder and similar material into pieces, and more particularly to an apparatus comprising a casing having a horizontally arranged rotor therein with the rotor having a plurality of radially extending knives which, upon rotation of the rotor, are arranged to pass between a plurality of stationary knives arranged in a row, which serve as a grate for the material to be cut during the cutting operation. The casing is open at the upper side as well as at the lower side of the rotor to form a feeding opening for the material to be cut and a discharge opening for the cut material, with the openings extending substantially the length of the rotor. A particular feature of the invention is having the feeding opening of the casing connected to the discharge opening of the casing of a conveyer fan for conveying the material to be cut to the cutting device. Another feature is the provision of the cutting edge on the stationary knives facing downwardly towards the upwardly moving side of the knives on the rotor. The casing of the cutting device has between the feeding opening and the discharge opening below the stationary knives a wall portion which is situated outside the rotation path of the rotating knives and continues in the wall around the feeding opening of the casing forming an angle ridge.

An apparatus embodying the features of this invention cuts the straw in a very effective way. The cutting members are completely enclosed by the casing, and there is thus no risk for the operating person to be hurt. The rotor serves not only as a cutting device but also as a fan to aid the conveyer fan in conveying the cut material to a silo, a barn or a hayloft. Due to the use of a conveying fan for the feeding of the cut material from below towards the stationary knives, the feeding becomes very even, and as a result the cutting is made very effective.

It is an object of this invention to provide a new and useful apparatus for cutting straw and similar material into small pieces, which apparatus is highly efficient, economical to run, and reduces the risk of injuries to the operator.

These and further objects and advantages will be readily apparent to those skilled in the art upon reading the following detailed description taken in conjunction with the appended drawings, in which.

Figure 1:
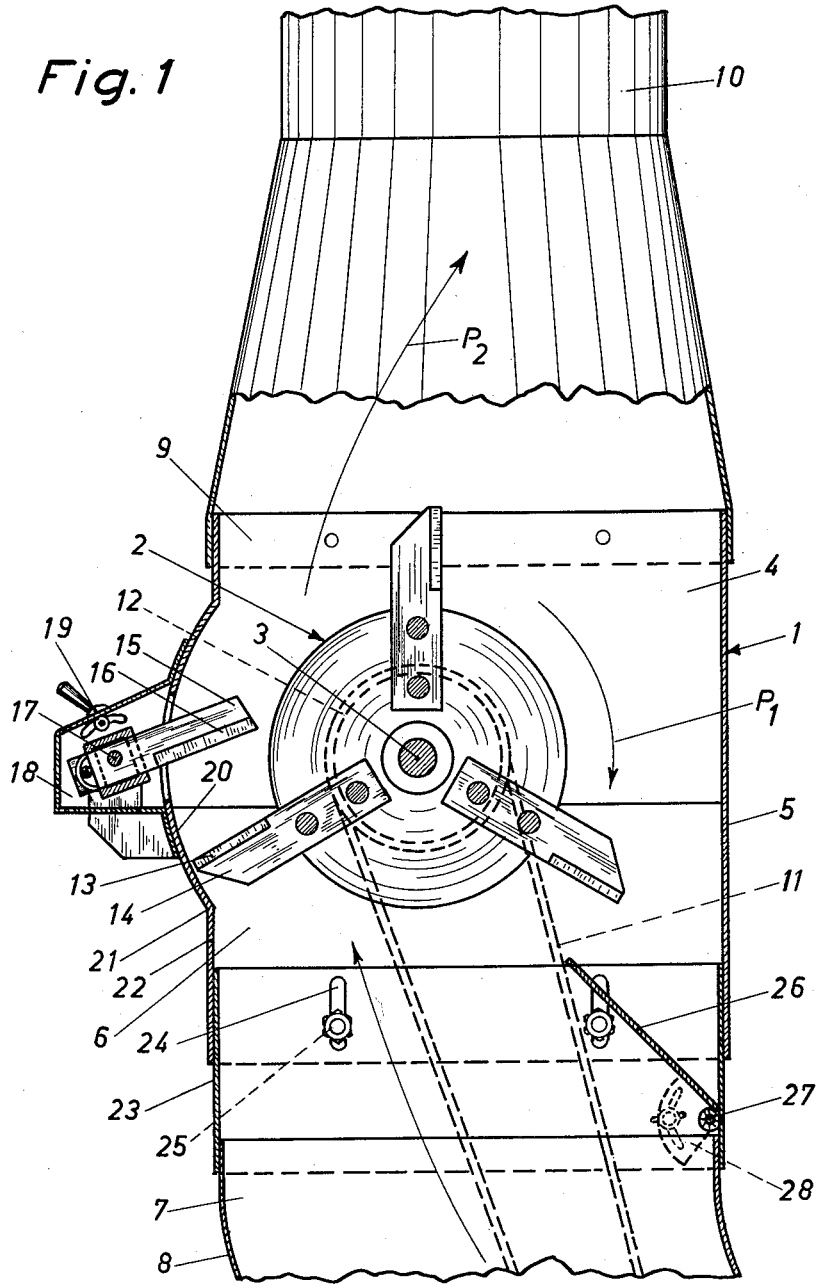
FIGURE 1 is a side elevational view partially in section of a cutting apparatus embodying the features of this invention.

The cutting device 1 comprises a rotor 2 having its shaft 3 rotatably supported in the end walls 4 of a sheet metal casing 5 which encloses the rotor 2. The casing 5 is at its lower end provided with an opening 6 to receive the green fodder, or the like to be cut, fed from a conveyer fan situated below said opening 6 and in communication therewith through discharge opening 7 of the casing 8 of the conveyer fan. The casing 5 is at its upper end provided with a discharge opening 9 for the cut material. The feeding opening 6 and the discharge opening 9 extend substantially the length of the rotor 2. A tube 10 is connected to the upper end of the casing 5 at discharge opening 9 for conveying the cut material to a silo or a barn.

Figure 2:
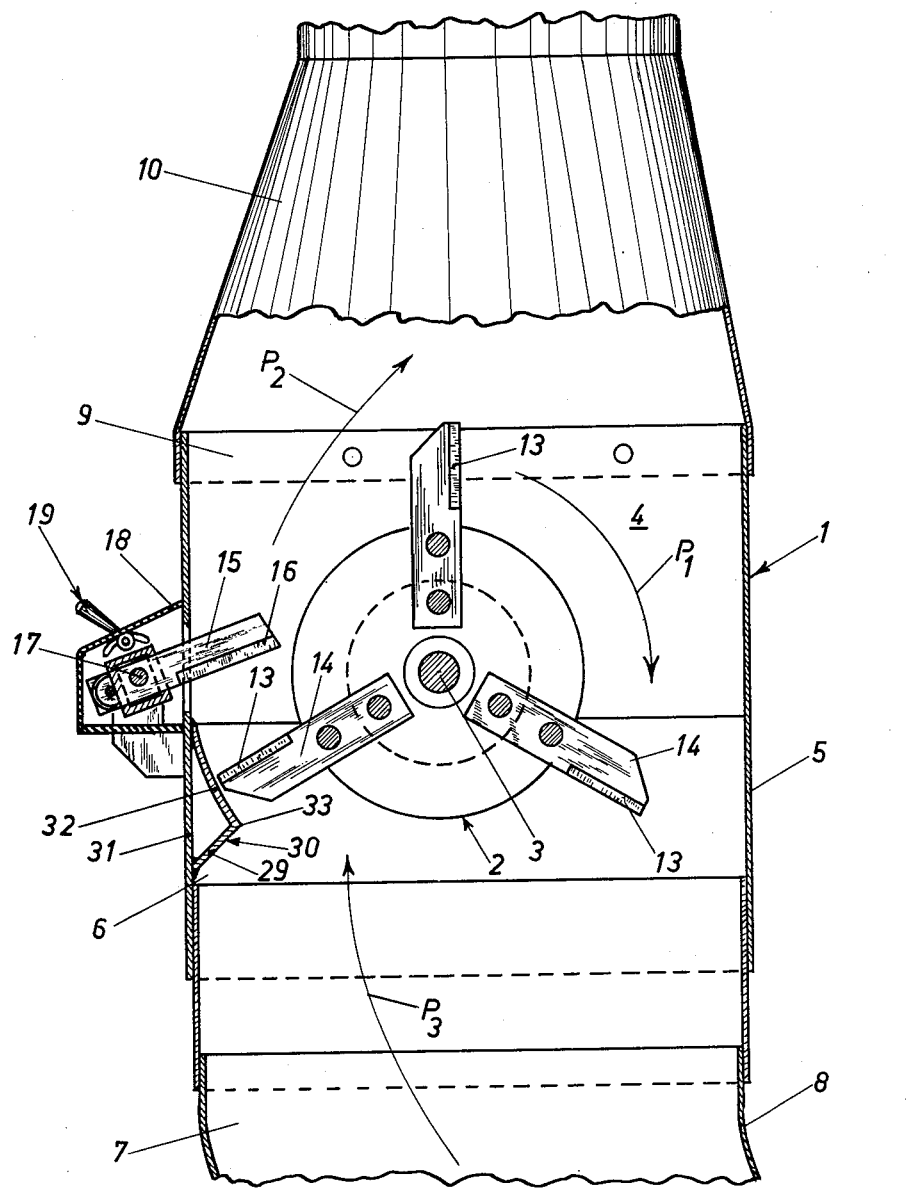
FIGURE 2 is a view corresponding to FIG. 1 but showing one modification of an apparatus embodying a feature of this invention.

The rotor 2 in the embodiment shown in FIG. 2 is driven by the conveying fan by means of a belt 11 which is trained over a pulley 12 on one end of the shaft 3 and is drivingly connected to the fan shaft. The rotor 2 is provided with three rows of essentially radially extending spaced knives 14 having cutting edges 13, which are adapted to pass upon the rotation of the rotor 2 (see the arrow $P_1$), between a row of stationary knives 15 having their cutting edges 16 turned downwardly towards the edge 13 on the upwardly moving knives 14 of the rotor 2. Each one of the rotor knives 14 passes approximately in the middle of the space between two adjacent knives 15. The stationary knives 15, preferably have a distance between them of 1½"–2½" and a thickness of 3/16"–5/16", are mounted to be turned about a horizontal axis 17 disposed in an external box 18 on the casing 5. The cutting angle of the knives 15 can be changed by turning them about axis 17 by means of an adjustment device 19.

The casing 5 (FIG. 1) below the external box 18, has a cylindrical wall portion 20 which forms an obtuse angled ridge 21 in the casing wall 22 around one side of the feeding opening 6. The cylinder-shaped wall portion 20 is concentrically arranged in relation to the motion path of the knives 14 and is situated a short distance from the outer end of the knives 14. Straws conveyed lengthwise upwardly in the conveying direction are turned by the ridge 21 when they pass over it and are bent over said ridge in such a way that they will be forced cross-wise against the stationary knives 15. If the distance between the ends of knives 14 and the wall portion 20 is made as small as 1/32"–3/32", the straw material when pressed against the wall portion 20, will be partly disintegrated by the ends of the knives 14. The desirable turning effect of the ridge 21, stated above, is obtained also when the distance between the wall portion 20 and the ends is made considerably larger, e.g. ¾"–1".

The casing 5 is connected to the fan casing 8 by means of a distance or spacer piece 23 which has the form of a cylindrical sheet border and may, for instance, be riveted to the upper end of the fan casing 8. In order to make it easy to stretch the driving belt 11, oblong apertures 24 are provided in distance piece 23, and extending in a vertical direction and being each passed through by a bolt 25. The casing may be locked at the desired level by means of the bolts 25 whereby the necessary stretching in the belt 11 is obtained.

A damper 26 is arranged at the portion of the distance piece 23 situated opposite the wall portion 20, and is rotatable about a shaft 27 at its lower edge, the angle position being adjustable by means of an adjusting device 28. In operation the stream of conveying air and straw are directed from the conveying fan towards the ridge 21 at the feeding opening 6, and the rotor 2 presses the straw from the opening 6 by means of the knives 14 along the wall portion 20 to the stationary knives 15, where the cutting operation takes place. The cut material is blown by means of the air stream (see the arrow $P_2$) from conveying fan and the rotor 2 through the tube 10. The damper 26 prevents the air stream above the rotor 2 from being directed downwards (along the arrow $P_1$) by affording sufficiently strong resistance to prevent the forming of an air stream in that direction.

When green fodder is to be cut by means of this cutting device, the knives 15 should be removed. If the knives 15 project into the casing 5, the disintergation of the green fodder will be too effective and the obtained product will be pasty-like. The resistance offered by the ridge 21 and the cylinder-shaped wall portion 20 to the green fodder is sufficient to cause the knives 14 to disintegrate said fodder in such a way that it is suitable for being ensiled.

In FIG. 1 the wall portion 20 is shown to constitute a portion of a cylindrical casing. Another embodiment of this invention comprises a wall portion 20 which is shaped as a corrugated sheet and does not follow exactly the motion path of the outer end of the rotor knives. The wall 31 of the casing 5 is shown straight in the embodiment shown in FIG. 2. An angle piece 30, serving as a guiding shield, is attached to the wall 31, as by welding. The two flanges 29 and 32 of angle piece 30 form in the vicinity of the periphery of the knife rotor 2 a sharp, lateral ridge 33. The flange 32 is curved and extends inwardly to a distance of $\frac{7}{32}''-\frac{15}{32}''$ from the periphery of the rotor 2.

When the straw is thrown by the conveyer fan in the direction of the arrow $P_3$ up through the feeding opening 6, each single straw is forced to turn against the rotor 2 by means of the flange 29. Any straws, which are conveyed essentially lengthwise, with their foremost end projecting beyond the ridge 33, are forced by the knives 14 to be turned sidewards and are thus forced to be fed crosswise against the stationary knives 15. Great parts of the straw are torn by the knives 14 already when they are bent over the ridge 33. When the rotor knives 14 pass between the row of stationary knives 15, the straw is cut effectively and the cut material is forced by the stream of air up through the tube 10 in the direction of the arrow $P_2$.

Figure 3:
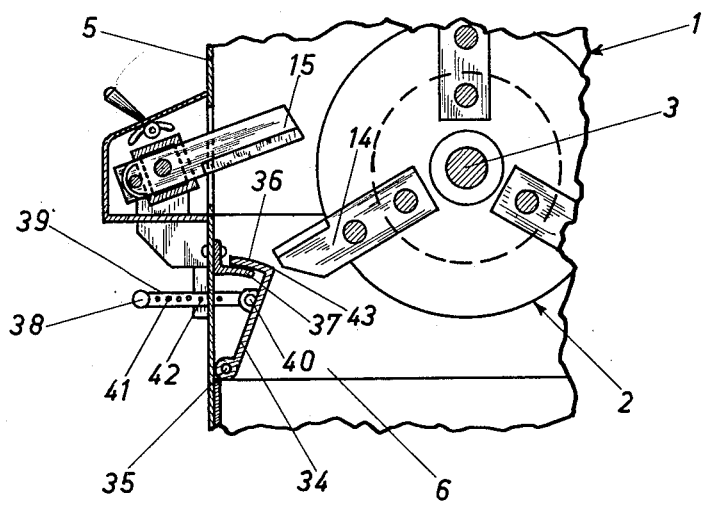
FIGURE 3 is a partial vertical section corresponding to FIG. 2 showing another embodiment of this invention.

In the embodiment shown in FIG. 3, the guiding shield comprises a pivoted shield or damper 34 which at its lower edge is rotatably mounted on a shaft 35 and which at its inner edge is provided with an obliquely outwardly turned flange 36 which overlaps partially a bracket 37 projecting into the interior of the casing 5. A rod 39 provided with a handle 38 is at its inner end hinged to the damper 34 by means of a pin 40 or the like. The rod 39 is further provided with holes 41 in which a pin 42 is insertable in order to adjust and lock the damper 34 in the desired angle position. The lateral ridge which is adapted to orientate the straw is in this Figure designated with 43. The effect of this ridge 43 and of the surface of the damper 34 turned towards the interior of the casing is essentially the same as described in the aforegoing with reference to the angle piece 30 in FIG. 2.

Figure 4:
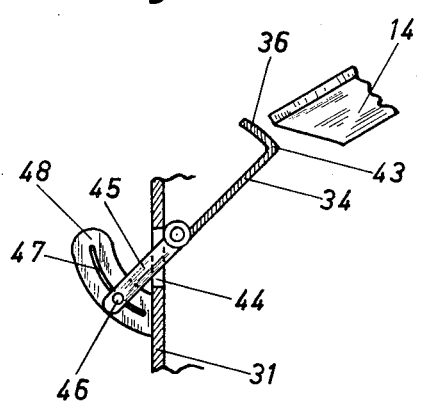
FIGURE 4 is a partial vertical sectional view of one embodiment of the guiding shield.

In FIG. 4 there is shown a similar pivoted shield or damper 34' serving as a guiding shield. The device for the adjustment and locking of the turning damper 34' differs, however, from the embodiment shown in FIG. 3. At the outer end of an arm 45, extending through an opening 44 in the wall 31 of the casing, there is arranged a locking bolt 46 which extends through an arcuate aperture 47 in an attachment plate 48. The damper can be locked in desired angle position by means of the bolt 46. The bracket 37 (FIG. 3) may be omitted, if desired, without adversely affecting the operation of the apparatus.

Figure 5:
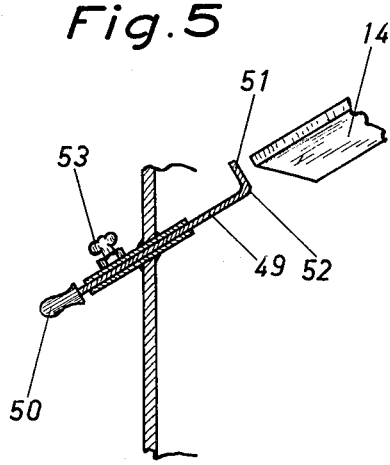
FIGURE 5 is a view corresponding to FIG. 4 but showing a still further embodiment of the guiding shield of this invention.

In the embodiment shown in FIG. 5, the guiding shield comprises a damper plate 49 which at its outer end is provided with a handle 50. The inner edge of the damper plate 49 is provided with an obliquely upwardly and outwardly turned flange 51. The ridge orientating the straws is designated with 52. The damper 49 may be moved in such a way that the flange 51 and the ridge 52 will be situated in a desired distance from the outer periphery of the rotor knives 14. The locking of the damper plate may be performed by means of a wing bolt 53.

When green fodder is to be cut by means of this embodiment of the apparatus, the knives 15 should be removed. If the knives 15 project into the casing 5, the green fodder will be cut so effectively that the obtained product will be almost pasty. The resistance offered by the lateral ridges 33, 43, and 52, respectively, in the various embodiments shown towards the green fodder is sufficient for the knives 14 to disintegrate the green fodder to such a degree that it will be suitable to be ensiled. Due to adjustability of the guide shields 34, 49, respectively, it is possible to change the degree of disintegrating of the green fodder.

It will thus be seen that there has been provided by this invention a device in which the various objects hereinbefore set forth, together with many practical advantages are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

What I claim is:

1. A device for cutting straw, green fodder, and the like, into small pieces, comprising: a substantially upright elongated casing; the upper end of said casing having a material discharge opening therein and the lower end having a material inlet therein; a transversely extending rotor rotatably mounted within said casing between said inlet and discharge openings and having a plurality of axially spaced radially extending cutting knives thereon; means to rotate said rotor and said knives within said casing; a transverse row of spaced stationary knives mounted on said casing adjacent said rotor and cooperating with said radially extending knives; said stationary knives being spaced to allow passage of one of said radially extending knives upwardly between adjacent stationary knives and said stationary knives having their cutting edges facing the cutting edges of said radially extending knives; and an inwardly projecting ridge on said casing between said stationary knives and said inlet opening to direct the material to be cut crosswise into said stationary knives.

2. The structure defined in claim 1 in which said inwardly projecting ridge comprises a transversely extending member of angulated cross-sectional configuration secured to the inner surface of said casing, the lower portion of said member defining an upwardly extending acute angle.

3. The structure defined in claim 1 in which said casing includes a transversely extending convex portion opposite said rotor and said stationary blades mounted in said convex portion and extend inwardly therefrom towards said rotor; and wherein said ridge is defined by the lower edge of said convex portion of said casing.

4. The structure defined in claim 1 in which an adjustable guiding shield is disposed on the side of said casing opposite from said ridge and adjacent to said inlet opening to direct material to be cut towards said ridge and to prevent cut material from passing downwardly between said rotor and the side of said casing opposite from said ridge.

5. A device for cutting straw, green fodder, and the like, into small pieces, comprising: a substantially upright elongated casing; the upper end of said casing having a material discharge opening therein and the lower end having a material inlet therein; a transversely extending rotor rotatably mounted within said casing between said inlet and discharge openings and having a plurality of axially spaced radially extending cutting knives thereon; a transverse row of spaced stationary knives mounted on said casing adjacent said rotor and cooperating with said radially extending knives; means to rotate said rotor and said knives within said casing upwardly relative to said stationary knives; said stationary knives being spaced to allow passage of one of said radially extending knives between adjacent stationary knives and said stationary knives having their cutting edges facing the cutting edges of said radially extending knives; and an inwardly projecting transversely extending guiding shield adjustably mounted in said casing adjacent said stationary knives and said rotor, and between said stationary knives in said inlet opening to direct material to be cut crosswise into said stationary knives.

6. The structure defined in claim 5 in which said guiding shield has an upwardly and outwardly turned flange at its inner edge, said flange being directed toward said stationary knives to direct the material to be cut crosswise into said stationary knives.

7. The structure defined in claim 6 wherein said guiding shield is pivotally mounted at its outer end to the wall of said casing whereby the angle of said flange with respect to said stationary knives may be varied to direct material to be cut towards said stationary knives.

8. A device for cutting straw, green fodder, and the like, into small pieces, comprising: a substantially upright elongated casing; the upper end of said casing having a material discharge opening therein and the lower end having a material inlet therein; a transversely extending rotor rotatably mounted within said casing between said inlet and discharge openings and having a plurality of axially spaced radially extending cutting knives thereon; means to rotate said rotor and said knives; a transverse row of spaced stationary knives mounted in said casing adjacent said rotor and cooperating with said radially extending knives; said stationary knives being spaced to allow passage of one of said radially extending knives upwardly between adjacent stationary knives, said stationary knives having their cutting edges facing the cutting edges of said radially extending knives.

References Cited in the file of this patent

UNITED STATES PATENTS

| | | |
|---|---|---|
| 1,172,114 | Debaker | Feb. 15, 1916 |
| 1,645,770 | Olson | Oct. 18, 1927 |
| 1,844,750 | Ellis | Feb. 9, 1932 |
| 2,105,803 | Barnes | Jan. 18, 1938 |
| 2,281,846 | Klein | May 5, 1942 |
| 2,496,359 | Rymann | Feb. 7, 1950 |
| 2,554,669 | Elofson | May 29, 1951 |

FOREIGN PATENTS

| | | |
|---|---|---|
| 851,143 | Germany | Oct. 2, 1952 |
| 862,383 | Germany | Jan. 12, 1953 |